United States Patent [19]
Kreuz et al.

[11] 3,849,085
[45] Nov. 19, 1974

[54] MOTOR FUEL COMPOSITION

[75] Inventors: Kenneth L. Kreuz, Fishkill; Matthew A. McMahon, Wappingers Falls, both of N.Y.

[73] Assignee: Texaco Inc., New York, N.Y.

[22] Filed: May 8, 1972

[21] Appl. No.: 251,001

[52] U.S. Cl............................................ 44/78, 44/58
[51] Int. Cl................................................ C10l 1/18
[58] Field of Search............................. 44/75, 78, 58

[56] References Cited
UNITED STATES PATENTS

| | | | |
|---|---|---|---|
| 2,202,877 | 6/1940 | Stevens et al. | 44/78 |
| 2,213,596 | 9/1940 | Shmidl et al. | 44/78 |
| 3,075,832 | 1/1963 | Ecke et al. | 44/78 |
| 3,265,742 | 8/1966 | Spacht | 44/78 |
| 3,554,945 | 1/1971 | Andress, Jr., et al. | 44/78 |

*Primary Examiner*—Daniel E. Wyman
*Assistant Examiner*—Y. H. Smith
*Attorney, Agent, or Firm*—T. H. Whaley; C. G. Ries

[57] ABSTRACT

Motor fuel composition for a spark-ignited reciprocating internal combustion engine containing a high molecular weight aliphatic hydrocarbon substituted or alkylated phenol in which the aliphatic hydrocarbon radical has a molecular weight in the range from about 500 to 3,500 effective to prevent or inhibit intake manifold and intake valve and port deposits.

10 Claims, No Drawings

MOTOR FUEL COMPOSITION

BACKGROUND OF THE INVENTION

1. Field of the Invention

Carbonaceous deposits on and around the intake valves and ports of a spark-ignited reciprocating internal combustion engine seriously interfere with the proper operation, efficiency and life of the engine. As such deposits build up, the engine will exhibit a substantial loss of power, rough idling and eventually burning of the valve face and seat. On further deposits build-up, portions of the hard carbonaceous deposits will break off and be drawn into the combustion chamber of the engine where mechanical damage to the piston and piston rings can occur.

Considerable work has been done to determine the nature and cause of the deposits which form on intake valves and around the ports of gasoline engines. These deposits are composed of the by-products of fuel combustion and lubricating oil decomposition. The viscosity index improvers contained in high grade motor oils, which decompose under engine operating conditions and produce products that will act as binders for the deposits, such as polymethacrylate viscosity index improvers, are considered a major contributing cause of this problem.

A recent solution to this problem was the discovery that polymers formed from low molecular weight olefins having molecular weights ranging from about 500 to 3,500 were outstandingly effective for preventing or inhibiting the formation of intake valve and port deposits in an internal combustion engine. More particularly, gasoline compositions containing from about 0.01 to 0.20 volume percent of a polymer formed from a $C_2$ to $C_6$ unsaturated hydrocarbon within the prescribed molecular weight range prevented or substantially reduced the formation of intake valve and port deposits.

While the foregoing gasoline compositions have achieved considerable commercial acceptance, engine design and operating conditions are undergoing rapid change in order to provide automobiles which will meet and stay within strict statutory exhaust emission standards. These changes include the use of higher engine operating temperatures and the meeting of the emission standards within a short period of time after a cold engine start-up. It is known that the polymers referred to above are particularly sensitive to high temperatures in the intake manifold of the engine and that a portion of the polymer additive can decompose, tending to form deposits within the intake maniford and not be available for the purpose of preventing intake valve and port deposits in the engine.

2. Description of Prior Art

U.S. Pat. No. 3,502,451 discloses a motor fuel composition for a four-cycle, spark-ignited internal combustion engine to which polymers formed from a $C_2$ to $C_6$ unsaturated hydrocarbon have been added to prevent or reduce intake valve and port deposits.

U.S. Pat. No. 2,671,117 discloses a method for the manufacture of an alkylated hydroxy aromatic compound, such as an alkylphenol, by alkylating a phenol with an olefin polymer having a chain length of from 16 to 30 carbon atoms in the presence of a catalyst. The alkylphenols produced are intermediates in the preparation of lubricating oil additives and sulfonated detergents.

SUMMARY OF THE INVENTION

A novel motor fuel composition is provided comprising a mixture of hydrocarbons in the gasoline boiling range containing a minor amount of a high molecular weight aliphatic hydrocarbon substituted or alkylated phenol in which the aliphatic hydrocarbon radical has an average molecular weight in the range from about 500 to 3,500. A gasoline composition containing a minor amount of an aliphatic hydrocarbon substituted or alkylated phenol not only prevents or inhibits the formation of intake valve and port deposits in a gasoline engine but surprisingly enhances the performance of the fuel composition in an engine designed to operate at significantly higher operating temperatures with a minimum of decomposition and deposit formation in the manifold of the engine.

DESCRIPTION OF THE PREFERRED EMBODIMENTS

The motor fuel composition of the invention comprises a mixture of hydrocarbons in the gasoline boiling range containing from about 0.01 to 0.25 volume percent based on said composition of a high molecular weight aliphatic hydrocarbon substituted or alkylated phenol in which the aliphatic hydrocarbon or alkyl radical has an average molecular weight in the range from about 500 to 3,500. In a more preferred embodiment, the aliphatic hydrocarbon radical has an average molecular weight ranging from about 750 to 1,500 with the most preferred range being from about 800 to 1,200. The high molecular weight aliphatic hydrocarbon substituted phenol or alkylated phenol useful in the present invention will, for the most part, have the following formula:

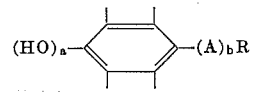

in which $a$ represents an integer from 1 to 2, A represents a lower alkyl radical having from 1 to 4 carbon atoms, $b$ is an integer from 0 to 1 and R is a high molecular weight aliphatic hydrocarbon radical having an average molecular weight from about 500 to 3,500. It is understood that the residual open bonds on the aromatic nucleus will be satisfied by hydrogen atoms.

The above compounds are derived from phenols. As employed herein, the term "phenol" refers to hydroxy aromatic hydrocarbons. Phenol compounds useful as starting materials for preparing the above compounds include mononuclear monohydroxy and polyhydroxy aromatic hydrocarbons. Specific compounds within these classes include phenol, cresol, xylenol, hydroquinone, pyrogallol and other monohydric and dihydric phenols. Corresponding compounds having low molecular weight alkyl radicals, such as $C_1$ to $C_4$-alkyl phenols, can also be employed as the phenol component. The compound, phenol, is the preferred hydroxy aromatic compound for the reaction.

The aliphatic hydrocarbon which is employed in the preparation of the high molecular weight aliphatic hydrocarbon substituted phenol is any natural or synthetic aliphatic hydrocarbon having a molecular weight in the range from about 500 to 3,500. Thus, this material may be obtained from mineral oils or other natural hydrocarbons or organic materials. It may also be prepared synthetically. For example, polymers, copolymers or the corresponding hydrogenated polymers or copolymers obtained from the polymerization of olefinic hydrocarbons, such as the $C_2$ to $C_6$ olefins, having the prescribed molecular weight are useful. Ethylene, propylene, 1,2-butylene, isobutylene and 2,3-butylene are particularly useful for preparing a suitable aliphatic hydrocarbon. The preparation and function in gasoline of such a useful class of olefin polymers is disclosed in U.S. Pat. No. 3,502,451 and such disclosure is incorporated in the present invention. The aliphatic hydrocarbon attached to the substituted phenol will generally be saturated; however, a small amount of olefinic unsaturation can be present in the aliphatic hydrocarbon and in the substituted phenol without undesirable effects.

Numerous methods are known for preparing the aliphatic hydrocarbon substituted hydroxy aromatic compounds or alkylated phenols described above and any of these are considered suitable for preparing the additive component of the gasoline composition of this invention. A particularly effective method for preparing an aliphatic hydrocarbon substituted phenol involves the reaction of a phenol with an olefinic polymer of prescribed molecular weight in the presence of an aluminum chloride-sulfuric acid catalyst. This reaction can be conducted at a temperature ranging from about 60° to 100°C. employing a phenol or other hydroxy aromatic hydrocarbon to olefin polymer mole ratio ranging from 1:0.1 to 1:0.3. The details of this method for alkylating a hydroxy aromatic hydrocarbon are set forth in U.S. Pat. No. 2,671,117 and the disclosure of this patent is incorporated in the present invention.

A preferred high molecular weight aliphatic hydrocarbon substituted phenol is represented by the following formula:

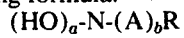

in which N represents a single ring aromatic nucleus, $a$ is 1, $b$ is O and R is an aliphatic hydrocarbon radical having from about 500 to 3,500 molecular weight.

A still more preferred high molecular weight aliphatic hydrocarbon substituted phenol is represented by the formula:

in which R has the values noted above.

The base fuel of the invention comprises a mixture of hydrocarbons boiling in the gasoline boiling range. This base fuel may consist of straight chain or branched chain paraffins, cycloparaffins, olefins and aromatic hydrocarbons or any mixture of these. This base fuel can be derived from straight run naphtha, polymer gasoline, natural gasoline, or from catalytically cracked or thermally cracked hydrocarbons and catalytically reformed stocks. The composition of the base fuel is not critical nor does the octane level of the base fuel have any material effect on the invention.

The base fuel may be blended with additives normally employed in preparing a motor fuel. For example, an anti-knock compound, such as a tetraalkyl lead compound including tetraethyl lead, tetramethyl lead and mixtures thereof, can be added to the base fuel. The tetraethyl lead mixture commercially available for automotive use contains an ethylene chloride-ethylene bromide mixture which acts as a scavenger for removing lead from the combustion chambers of the engine. The fuel composition may also contain any of the conventional anti-icing additives, corrosion inhibitors, dyes and the like.

The novel fuel composition of the invention is prepared by mixing a suitable amount of the prescribed alkylated hydroxy aromatic compound or alkylated phenol to the base gasoline. This additive component is employed in a concentration ranging from about 0.01 to 0.25 volume percent based on the total fuel composition. Very effective results are obtained when the additive concentration is in the range from about 0.03 to 0.15 volume percent, with the preferred concentration being from about 0.05 to 0.12 volume percent.

The following examples illustrate the preparation of an aliphatic hydrocarbon substituted phenol additive of the invention.

EXAMPLE I 141 grams (1.5 moles) of phenol were charged to a one-liter reactor. About 28 grams of an aluminum chloride-sulfuric acid catalyst were mixed with the phenol and the mixture heated to a temperature of 60°C. 425 grams of polypropylene having an average molecular weight of about 850 (Polymer A) dissolved in 100 milliliters of heptane were added to the mixture in the reactor. The reaction was continued at 80°C. for 5 hours, at which time heating was discontinued. 150 milliliters of a 1:1 hydrochloric acid solution were added to hydrolyze the catalyst. The mixture was allowed to cool to room temperature and the organic layer separated from the aqueous layer. The excess phenol was removed from the organic layer by washing with eight 200-milliliter portions of hot salt solution. The washed organic layer was heated at reflux with a mixture of 100 milliliters of 95 percent ethanol and 50 grams of aqueous sodium hydroxide. The solution was neutralized with 65 milliliters of concentrated hydrochloric acid. The layers were separated and 200 milliliters of ether were added. The ether solution was then washed twice with salt solution, the layers separated, and the ether removed in an evaporator. The polymeric residue was then heated at 180°C. under 4 millimeters of pressure to remove any remaining unreacted phenol. 380 grams of product were obtained having the following properties:

TABLE I

| | Polymer-Phenol Adduct | Unreacted Polymer A |
|---|---|---|
| Average Mol. Wt. | 849 | 850 |
| Kin. Vis. at 210°F. (Furol Method) | 125 | 80.9 |
| Wt. % Phenol by IR[1] | 4.9–6.1 | — |
| Wt. % Phenol by nmr[1] | 5.9 | — |
| Hydroxyl No. | 28 | — |

1) Phenol attached to polymer

EXAMPLE II

About 350 grams of phenol and about 1,060 grams of polypropylene, average molecular weight about 850 (Polymer A), were reacted according to the process of Example I above. Approximately 970 grams of product were recovered having the following properties:

TABLE II

| | Polymer-Phenol Adduct |
|---|---|
| Average Mol. Wt. | 925 |
| Kin. Vis. at 210°F. | 102 |
| Wt. % Phenol by IR | 2-2.5 |
| Wt. % Phenol by nmr | 3.3 |
| Hydroxyl No. | 22 |

The thermal stability of the alkylated phenol reaction product of the invention as compared to the unreacted polypropylene polymer was determined by placing about 35 milligrams of the polymers being tested on a small glass planchette and spreading it evenly over the surface by mixing with a drop or two of heptane. The heptane was then evaporated off and the planchette was placed in an oven held at 180°C. for test periods of 1 to 2 hours. The planchette was then removed from the oven and the thermally-treated samples dissolved in 0.200 ml. of chloroform and infrared spectra of the solutions determined at a wavelength of 5.8 u. The results are set forth in the following table.

TABLE III

OVEN OXIDATION TEST AT 180°C.
Absorbances at 5.8 $\mu$.

| Time at 180°C., Hrs. | Product of Example I | Product of Example II | Unreacted Polymer A |
|---|---|---|---|
| 1 | 0.121 | 0.160 | 0.500 |
| 2 | 0.125 | 0.280 | 0.460 |

The foregoing tests demonstrate that the high molecular weight alkylated phenol reaction product of the invention is much more oxidation stable at high temperature than the unreacted polypropylene, Polymer A.

In order to demonstrate that phenol has to be bonded to the polymer in order to increase the oxidation stability of the polymer, solutions of 1.6 to 3.3 percent phenol in polypropylene of about 850 molecular weight (Polymer A) were prepared and subjected to the oven oxidation test described above. The results of this test are set forth in the following table.

TABLE IV

RESULTS OF OVEN OXIDATION TEST AT 180°C.
Absorbance at 5.8 $\mu$.

| Hours Heating at 180°C. | 1.65% Phenol in Polymer A | 3.3% Phenol in Polymer A |
|---|---|---|
| 1 | 0.670 | 0.620 |
| 2 | 0.615 | 0.615 |

Comparison of the above data with the data obtained in Table III above shows that a mixture of phenol and polypropylene (Polymer A) does not possess the oxidation stability of the alkylated polymer of the invention.

A particular feature of the alkylated phenol reaction product of the invention is that it does not decompose or form excessive deposits in the intake manifold of an engine. This was demonstrated by running fuel compositions of the invention and comparison fuel composition in the Convolute Manifold Test.

The Convolute Manifold Test is a test designed to evaluate the tendency of fuels and fuel additives to form induction system deposits. This test is run on a single-cylinder, 4-stroke, Model MAJ Onan L-head engine. The engine is coupled to a three-phase, constant-speed induction motor (1,725 rpm) and the load is indicated by means of a wattmeter.

A convolute manifold is mounted between the carburetor and the intake port of the single-cylinder engine and has a diameter of ⅞ of an inch. During the test the skin temperature of the manifold was controlled at a temperature of about 350°±3°F. by means of a variac connected to strip heaters strapped to the exterior of the manifold. The engine is run for 20 hours employing the fuel composition being tested. On completion of the engine running time, the convolute manifold is removed, opened and cleaned using the following procedure:

Deposits are removed from the manifold by wetting with benzene and brushing with a stiff bristle brush. Any insoluble material is scraped with a beryllium-copper knife and added to the washings. The washings are collected in a clean tared vessel, the solvent evaporated to dryness and the weight of the deposits obtained to the nearest milligram.

The deposits are then washed with pentane and filtered through a Whatman No. 4 filter paper. The filtrate is evaporated to dryness and the weight of the deposits obtained to the nearest milligram, as above. The weight of the deposits obtained in Step 2 is subtracted from the weight of the original deposits and the difference represents the weight of the pentane insoluble deposits. Isooctane was employed as the base fuel in some of the runs and a premium commercial gasoline composition was employed in the balance of the runs. The results of the Convolute Manifold Test are set forth in the table below.

TABLE V

CONVOLUTE MANIFOLD TEST RESULTS

| Run[1] | Fuel Composition | Total Deposits Mg | Pentane Insoluble Deposits, Mg |
|---|---|---|---|
| 1 | Commercial Gasoline A + 0.075 V. % Polypropylene-850 (Polymer A) | 1128 | 560 |
| 2 | Commercial Gasoline A + 0.065 V. % Product of Example II | 231 | 112 |
| 3 | Commercial Gasoline A + 0.065 V. % Product of Example II | 340 | 34 |
| 4 | Isooctane + 0.075 V. % Polymer A[2] | 1088 | 527 |
| 5 | Isooctane + 0.075 V. % Polymer A[2] | 870 | 654 |
| 6 | Isooctane + 0.075 V. % Product of Example I[2] | 303 | 24.3 |
| 7 | Isooctane + 0.075 V. % Product of Example I | 234 | 3.0 |
| 8 | Isooctane + 0.075 V. % Product of Example II | 215 | 20.3 |

[1] All Runs conducted at 400°F. Manifold Skin Temperature, except Run 3 where the temperature was 350°F.
[2] These fuels contained identical amounts of the same conventional anti-rust additive, carburetor detergent and upper-cylinder lubricant, in addition to equivalent amounts of unreacted Polymer A or the indicated product of the invention.

In the case of the commercial gasoline, the use of the product of the invention in Runs 2 and 3 resulted in a three- to four-fold or more reduction in the deposits determined either as Total Deposits or Pentane Insoluble Deposits.

Similar results were obtained when isooctane was employed as the base fuel. In this series of runs, Runs 6 to 8 show a remarkable improvement over Runs 4 and 5.

The foregoing tests demonstrate that the present invention provides a gasoline composition that is suitable for use in modern, high-temperature gasoline engines which providing surprising, substantial improvements in engine deposits.

We claim:

1. A motor fuel composition comprising a mixture of hydrocarbons in the gasoline boiling range containing from about 0.01 to 0.25 volume percent based on said composition of a saturated aliphatic hydrocarbon substituted phenol represented by the formula:

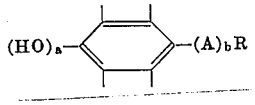

in which $a$ represents an integer from 1 to 2, A represents a lower aliphatic radical having from 1 to 4 carbon atoms, $b$ is an integer from 0 to 1, R represents an aliphatic hydrocarbon radical having an average molecular weight from about 500 to 3,500 and the residual open bonds are satisfied by hydrogen atoms.

2. A motor fuel composition according to claim 1 in which said substituted phenol has the formula:

$(HO)_a\text{-}N\text{-}(A)_bR$ in which N represents a single-ring aromatic nucleus and $a$, $b$, and R have the values given in claim 1.

3. A motor fuel composition according to claim 1 in which said substituted phenol has the formula:

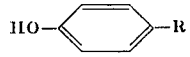

in which R is an aliphatic hydrocarbon radical having from about 500 to 3500 molecular weight.

4. A motor fuel composition according to claim 1 in which R has an average molecular weight ranging from about 750 to 1,500.

5. A motor fuel composition according to claim 1 in which R is derived from polypropylene.

6. A motor fuel composition according to claim 1 in which R is derived from polyisobutylene.

7. A motor fuel composition according to claim 1 in which R is derived from a mixture of polyolefin polymers.

8. A motor fuel composition according to claim 1 in which A represents a methyl radical.

9. A motor fuel composition according to claim 1 in which R has an average molecular weight in the range from about 800 to 1,200.

10. A motor fuel composition according to claim 1 in which R is derived from polypropylene of about 850 average molecular weight.

* * * * *